United States Patent
Sweeney

(10) Patent No.: US 11,113,710 B2
(45) Date of Patent: Sep. 7, 2021

(54) MODEL-BASED PROMOTION AND PRICE COMPUTATION SYSTEM AND METHOD

(71) Applicant: Philip Morris USA Inc., Richmond, VA (US)

(72) Inventor: William R. Sweeney, Richmond, VA (US)

(73) Assignee: PHILIP MORRIS USA INC., Richmond, VA (US)

( * ) Notice: Subject to any disclaimer, the term of this patent is extended or adjusted under 35 U.S.C. 154(b) by 1032 days.

(21) Appl. No.: 14/461,925

(22) Filed: Aug. 18, 2014

(65) Prior Publication Data

US 2014/0351022 A1    Nov. 27, 2014

Related U.S. Application Data

(63) Continuation of application No. 10/729,968, filed on Dec. 9, 2003, now Pat. No. 8,812,348.

(60) Provisional application No. 60/435,359, filed on Dec. 23, 2002.

(51) Int. Cl.
  *G07F 17/32* (2006.01)
  *G06Q 30/02* (2012.01)
  *G06Q 30/00* (2012.01)

(52) U.S. Cl.
  CPC ......... *G06Q 30/0225* (2013.01); *G06Q 30/00* (2013.01); *G06Q 30/0283* (2013.01)

(58) Field of Classification Search
  USPC .......................... 705/7.35, 14.1, 14.12, 14.17
  See application file for complete search history.

(56) References Cited

U.S. PATENT DOCUMENTS

| | | |
|---|---|---|
| 4,002,886 A | 1/1977 | Sundelin |
| 4,500,880 A | 2/1985 | Gomersall et al. |
| 5,448,226 A | 9/1995 | Failing, Jr. et al. |
| 5,632,010 A | 5/1997 | Briechle et al. |
| 5,796,351 A | 8/1998 | Yabuki |
| 5,907,143 A | 5/1999 | Goodwin, III |
| 5,914,670 A | 6/1999 | Goodwin, III et al. |
| 5,933,813 A * | 8/1999 | Teicher ............... G06Q 10/087 235/375 |
| 5,977,998 A | 11/1999 | Briechle et al. |
| 5,995,015 A | 11/1999 | DeTemple et al. |
| 6,012,040 A | 1/2000 | Goodwin, III |
| 6,021,395 A | 2/2000 | Goodwin, III |
| 6,026,373 A | 2/2000 | Goodwin III |
| 6,031,585 A | 2/2000 | Stevens, III |
| 6,047,263 A | 4/2000 | Goodwin, III |
| 6,089,453 A | 7/2000 | Kayser et al. |
| 6,223,163 B1 | 4/2001 | Van Luchene |
| 6,332,127 B1 * | 12/2001 | Bandera ................. G06Q 30/02 705/14.55 |

(Continued)

*Primary Examiner* — Akiba K Robinson
(74) *Attorney, Agent, or Firm* — Harness, Dickey & Pierce, P.L.C.

(57) ABSTRACT

A system and method for providing model-based promotion and price computation is described in which promotional offers in the form of promotion information from a manufacturer are combined with price determination parameters from the retailer to calculate a final retail price. The system prevents fraud by eliminating the heavy dependence on unverifiable trust between the retailer and manufacturer and by assuring that the consumer will receive the benefit of the promotions intended by the manufacturer.

21 Claims, 11 Drawing Sheets

(56) References Cited

U.S. PATENT DOCUMENTS

| | | | |
|---|---|---|---|
| 6,845,396 B1 | 1/2005 | Kanojia et al. | |
| 6,934,692 B1* | 8/2005 | Duncan | G06Q 20/10 |
| | | | 705/14.4 |
| 7,464,050 B1* | 12/2008 | Deaton | G06Q 20/20 |
| | | | 705/14.1 |
| 7,734,527 B2* | 6/2010 | Uzo | G06Q 20/06 |
| | | | 235/383 |
| 8,010,404 B1* | 8/2011 | Wu | G06Q 30/02 |
| | | | 705/1.1 |
| 2001/0014868 A1* | 8/2001 | Herz | G06Q 30/02 |
| | | | 705/14.38 |
| 2002/0010627 A1* | 1/2002 | Lerat | G06Q 30/02 |
| | | | 705/14.26 |
| 2002/0069107 A1 | 6/2002 | Werner | |
| 2003/0130883 A1 | 7/2003 | Schroeder et al. | |
| 2007/0189542 A1* | 8/2007 | Alldredge | G06Q 20/02 |
| | | | 380/283 |

\* cited by examiner

MODEL-BASED PROMOTION AND PRICE COMPUTATION SYSTEM AND METHOD

RELATED APPLICATION(S)

This application is a continuation of U.S. application Ser. No. 10/729,968, filed Dec. 9, 2003 which claims priority under 35 U.S.C. sctn. 119 to U.S. Provisional Application No. 60/435,359 entitled MODEL-BASED PROMOTION AND PRICE COMPUTATION SYSTEM AND METHOD, filed Dec. 23, 2002, the entire contents of which is hereby incorporated by reference.

BACKGROUND

In a free market society, many factors influence the eventual price of goods. For example, supply and demand are two common market forces that influence the final price of goods. However, in modern retail schemas it is the retailer who responds to these forces and formulates a final market or retail price for an item.

With the recent improvements in technology available to retailers, multiple techniques have been introduced to help assist a retailer in readily setting a retail price. One example of a device created to assist retailers in promoting sales of products is described in U.S. Pat. No. 5,933,813, entitled "Sales Promotion Data Processor System and Interactive Changeable Display Particularly Useful Therein," which issued on Aug. 3, 1999 to Teicher et al. The sales promotion system set forth in that document is a retailer tool for use in promoting sales, which includes an interactive electronic display, whereby various prices and promotions may be displayed for customers.

Likewise, a similar retailer tool is described in U.S. Pat. No. 6,012,040, entitled "EPL Price Change Verification System and Method," which issued on Jan. 4, 2000 to Goodwin, Ill. The electronic price label (EPL) system described in that document is a retailer tool that allows the display of prices to be readily changed by way of computer so that a retailer may effect changes in prices instantaneously for customers. Both of the above-mentioned patents, however, are primarily concerned with technology for displaying prices or promotions, and neither of these patents describe how one arrives at these prices or promotions.

U.S. Pat. No. 6,223,163 entitled "Method and Apparatus for Controlling Offers That Are Provided at a Point-of-Sale Terminal," which issued on Apr. 24, 2001 to Van Luchene, describes a method for calculating and transmitting pricing to be displayed on a point-of-sale (POS) terminal. Specifically, the prices displayed on the POS terminal in this patent are determined according to performance parameters associated with a number of offers. For example, acceptance rate, profit rate, or velocity of sales are some performance parameters that may be measured to adjust pricing displayed on the POS terminal by way of changing the promotion plan associated therewith. However, this patent does not describe a technique whereby manufacturers and retailers may both contribute inputs to an overall price model.

Traditionally, price models for various promotions are arrived at as manufacturers and retailers enter into a complex contractual agreement, and undergo a series of information exchanges for auditing purposes. It is not permitted under law, however, for a manufacturer to fix resale prices. Thus, a manufacturer, while allowed to promote a product by way of special promotional activities, is not allowed to set the retail price of products. This final retail price determination is left to the retailer.

Because the manufacturer's ability to promote its products relies heavily upon contractual agreements and personal communication with the retailer, there is a great deal of trust involved between them. When this trust is broken the retailer may profit improperly at the manufacturer's expense. One example of such a breach occurs when a retailer, despite agreeing to implement a rebate promotion, does not implement the promotion but profits by charging the full price for the promotionally supported product and then collecting the rebate payment from the manufacturer for that product.

Such breaches of trust and other fraudulent activities are difficult to detect because auditing procedures also inherently require a certain amount of trust between a retailer and the manufacturer. In the example given above, if a retailer takes advantage of a rebate promotion from the manufacturer, the only records which may be used to verify the retailer's claim for the rebate belong to the retailer itself. Thus, dishonest or unscrupulous retailers could take advantage of such a situation and could fabricate, manipulate, or conceal the records required by the manufacturer to audit the promotions.

In addition, traditional promotions schemas are subject to error other than fraudulent or deceptive practices. For example, if a company unintentionally delays implementation of a promotion for a few hours, the result could be a large unwarranted sum of money being paid from the manufacturer to the retailer without the savings being passed on to the consumer as contracted for by the manufacturer. Such an unintentional delay could occur, for example, as the result of a key employee being absent or late for work. Some estimates indicate that even the most conscientious companies have a compliance rate of less than 95% with such promotional pricing contracts.

Therefore, it is desirable to provide a system and method that allows effective implementation of manufacturer-based promotions, while avoiding potential legal problems by separating promotional offers, which come from a manufacturer, and the fixing of the final retail price for goods, which must be done by the retailer. Moreover, it is desirable for such a system to be convenient for both the retailer and manufacturer, and effective from the viewpoint of the consumer, while preventing any fraud in implementing promotional offers. Such a system and method should be implemented in a manner transparent to the consumer and convenient for both the retailer and manufacturer. That is, such a system and method should not be overly obtrusive to the customer and should readily mesh with the customary practices of the manufacturer and retailer, involving minimal effort from these parties. Furthermore, such a system should provide enhanced auditing capabilities for verifying proper implementation of manufacturer-based promotions by the retainer.

SUMMARY

A system and method for providing model-based promotion and price computation is described in which promotional offers in the form of promotion information from a manufacturer are combined with price determination parameters from the retailer to calculate a final retail price. The system prevents fraud by eliminating the heavy dependence on unverifiable trust between the retailer and manufacturer and by assuring that the consumer will receive the benefit of the promotions intended by the manufacturer.

In accordance with preferred embodiments, a system and method provide model-based promotion and price computation, wherein the price setting function and the ability to provide promotional pricing are effectively separated. The manufacturer is allowed to implement promotional plans by providing promotional information to be incorporated in a pricing model, while the retailer is allowed to set the final retail price of goods. Thus, the system and method essentially implement a promotional contract previously agreed to by both the retailer and manufacturer. The retailer is free to decline implementation of the manufacturer-based promotion. However, the auditing capability of the system, according to preferred embodiments maintains a record of any such failures to implement promotions, which may be accessed by the manufacturer.

Additionally, in accordance with preferred embodiments, the complexities and the potential for fraud and mistake associated with interpersonal contractual agreements between retailers and manufacturers are minimized. This is accomplished by way of the secure auditing capability of the system that allows retailers to set their prices and assures either that consumers will receive the benefit of a manufacturer's POS promotions intended for them, or that the manufacturer will be alerted to promotions not implemented. The auditing information obtained by the system may be maintained in an encrypted file and/or communicated to a manufacturer by way of a secure data link, or by some other secure technique, thereby guaranteeing the security and integrity of the data.

According to an embodiment, manufacturers and retailers may communicate with each other and with the system by way of digital communications links. Retail prices calculated by way of the system may be automatically implemented by way of an electronic price display device, or the like. Additionally, such prices may be communicated to an electronic cash register, or other POS device, for instant implementation and correlation with any dynamic prices displayed on the display device.

DETAILED DESCRIPTION OF PREFERRED EMBODIMENTS

In the following description, for the purpose of explanation and not limitation, while certain details are set forth, such as particular techniques, steps, and system components it will be apparent to those skilled in the art that the apparatus and methods described herein may depart from these details. In some instances, specific detailed descriptions of well-known concepts and methods are omitted. In addition, it will be recognized that, while the apparatus and methods have many ways in which they can be implemented, prudent implementations will observe all the various governing laws, regulations, and other legal requirements.

Figure 1:
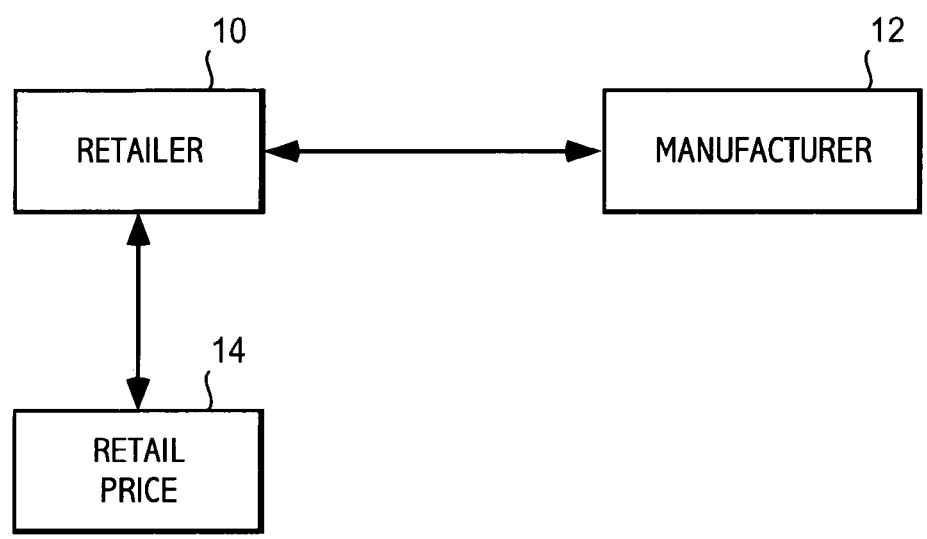
FIG. 1 is a block diagram of a traditional retailer-centered price management system.

A block diagram of a traditional retailer-centered price management system is illustrated in FIG. 1. In this system, a retailer 10 and manufacturer 12 communicate between one another. These communications may include, for example, contractual agreements regarding promotional offers intended to be passed from the manufacturer to the consumer by way of a reduction in the retail price 14. The retail price 14 is set by the retailer in accordance with any contracts between the retailer 10 and the manufacturer 12, and the manufacturer 12 assumes that the retail price 14 reflects any agreed to promotional offers from the manufacturer 12.

The traditional retailer-centered price management system illustrated in FIG. 1 may be disadvantageous for several reasons. For example, the manufacturer 12 must trust the retailer 10 to properly implement any promotions for which the retailer 10 and the manufacturer 12 have contracted. Additionally, as the retailer 10 has total control over the retail price 14 and any information regarding sales, the manufacturer 12 must rely upon information from the retailer 10 to audit the retailer's implementation of promotions from the manufacturer 12. Therefore, unless the retailer's records are accurate, it may be difficult to ascertain whether consumers actually received the intended benefit (e.g., a price discount).

Figure 2:
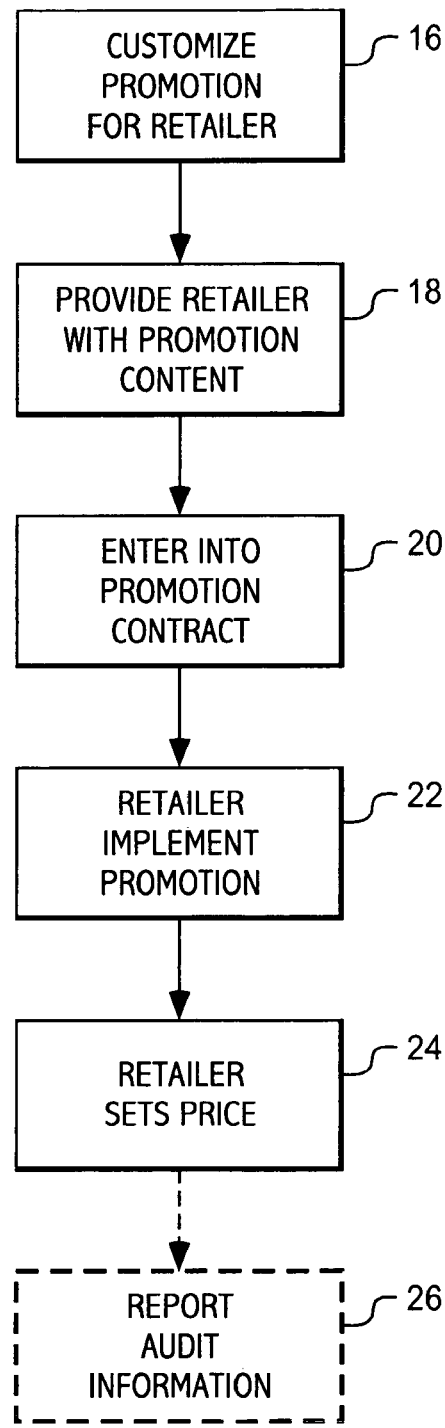
FIG. 2 is a flow diagram of a traditional retailer-centered promotion method.

FIG. 2 illustrates a flow diagram representing steps that may be followed to implement promotions from the manufacturer 12 in a retailer-centered promotion and price computation system, such as the system shown in FIG. 1. First, a manufacturer 12 must devise a promotion and customize promotion information for the specific retailer 10 with which it is dealing, as illustrated in step 16. Then, the manufacturer must provide the retailer with a promotion contract in step 18 outlining the terms of promotions, which the retailer enters into in step 20. Subsequently, in accordance with the contract entered into in step 20, the retailer 10 implements the manufacturer's promotion in step 22 and sets the retail price of goods in step 24. The retailer 10 may report promotion information to the manufacturer 12 in optional step 26 to enable the manufacturer 12 to audit the retailer 10. Those skilled in the art will recognize that such information may be required by law and/or the manufacturer 12.

As discussed above, the system shown in FIG. 1 and the technique described in connection with FIG. 2 have inherent problems. Specifically, because of the nature of the contractual relationship between the retailer 10 and the manufacturer 12, a certain level of trust is required between these entities. As previously indicated, should this trust be broken, whether intentionally by fraud or unintentionally by mistake, it is the manufacturer 12 and consumers who may suffer. For example, if a manufacturer's promotion typically is improperly implemented, resources intended for the consumers may be improperly allocated to the retailer 10. Additionally, if the auditing of improperly implemented promotions is compromised, the manufacturer is unable to verify the proper allocation of manufacturer's resources to the client.

Figure 3:
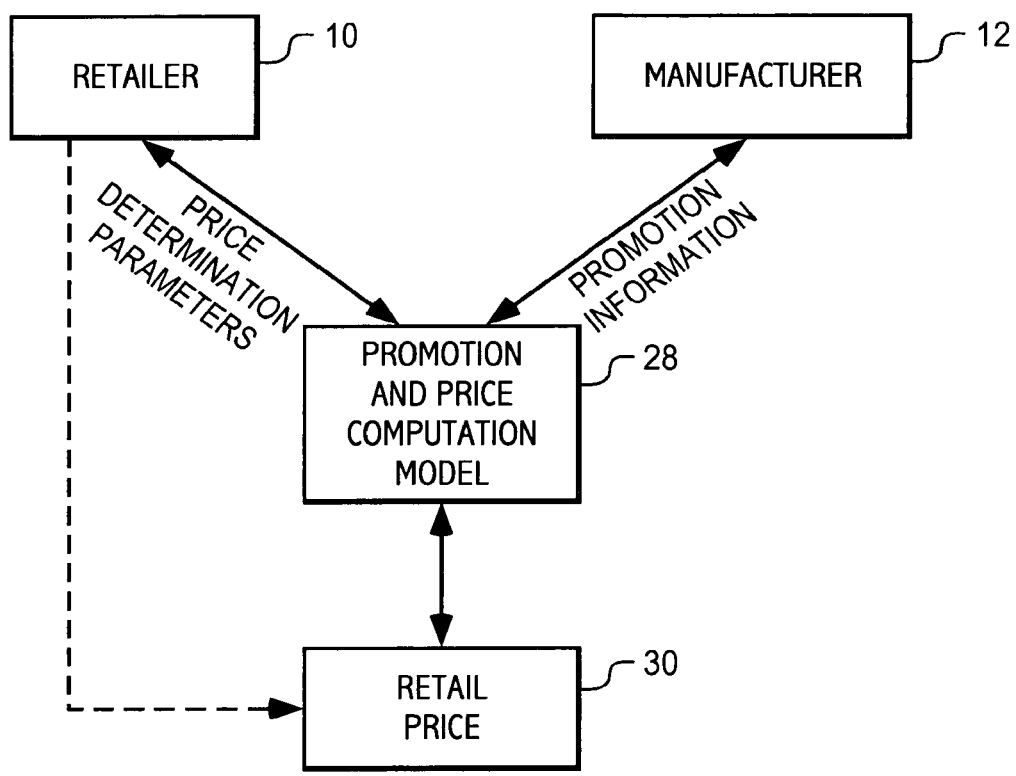
FIG. 3 is a block diagram of a model-based promotion and price computation system according to an embodiment.

In FIG. 3, a model-based promotion and price computation system is illustrated in block diagram form. This model-based promotion and price computation system addresses problems associated with prior approaches, such as poor implementation of promotions or unreliable auditing information. In this system, both the retailer 10 and the manufacturer 12 contribute information to a promotion and price computation model 28 that calculates a retail price 30. Specifically, the manufacturer 12 contributes promotion information, generally in the form of a manufacturer "buydown" or discount, and the retailer 10 contributes price determination parameters. It is from the promotion and price computation model 28 that a retail price 30 is calculated. Thus, the promotion and price computation model 28 implements contractual promotional agreements between the retailer 10 and the manufacturer 12. One technique by which prices are calculated according to the price computation model 28 is discussed in greater detail below with reference to FIGS. 6, 7 and 8.

Those skilled in the art recognize that although the retailer 10 and the manufacturer 12 contribute to the promotion and price computation model 28, the retailer 10 has ultimate control over the retail price 30. This ultimate control of the retailer 10 is illustrated in FIG. 3 by a dashed line, which indicates the retailer 10 may bypass the promotion and price computation model 28 and set the retail price 30 without considering the manufacturer's promotion information. Thus, by having the ability to bypass the promotion and price computation model 28, the retailer 10 has direct control of the retail price 30. The retailer's ability to bypass the price computation model 28 is discussed in greater detail below with respect to FIGS. 7 and 8.

In addition to the retailer's optional bypass control, the retailer's input into the computation model 28 may be changed to adjust the retail price 30 without bypassing any promotion information from the manufacturer 12. Therefore, this second mode of changing retail prices might be preferred, as it would likely not entail any possible breach of the contract between the retailer 10 and the manufacturer 12. The system by which the model-based promotion and price computation system of FIG. 3 is implemented is discussed subsequently with respect to FIG. 5, and advantageously provides for automated and accurate auditing of sales activities and actual prices of goods sold.

The model-based system illustrated in FIG. 3 is advantageous, as it facilitates the retailer's ability to use the manufacturer's promotion information and the retailer's own price determination parameters in calculating the retail price 28. In accordance with the system shown in FIG. 3, a manufacturer's point-of-sale (POS) promotion information could automatically be factored into the promotion and price computation model 28 along with price determination parameters from the retailer 10 without requiring the retailer 10 to manually change prices. It is contemplated that retailer 10 of FIG. 3 can vary inputs to the price computation model 28 or institute internal promotions (e.g., using internal promotional monies, or promotional monies from other sources, or reduced margins, etc.) to change the retail price 30. However, if the model-based system of FIG. 3 is not bypassed by the retailer 10, the ability of the retailer 10 to institute internal promotions or price reductions does not affect or impair the ability of the manufacturer 12 to institute manufacturer-based promotions, by way of the price computation model 28, that pass additional savings to a consumer by lowering the retail price 30 paid by the consumer.

The system shown in FIG. 3 may arrive at a retail price 30 in a variety of manners as the promotion and price computation model 28 is somewhat flexible and adaptable depending upon parameters input from the retailer 10 and information from the manufacturer 12. For example, the promotion and price computation model 28 may include promotional information from the manufacturer 12, such as an instant cash back promotion in the form of a buydown, whereby every purchase made between certain times of day or on certain days of the week are made at a pre-determined, discounted price. The flow charts shown in FIGS. 4, 7 and 8 describe possible techniques for using the system of FIG. 3 for arriving at a retail price 30. However, these flowcharts illustrate only a limited number of possible techniques, and other techniques may be used by the system of FIG. 3.

The manufacturer 12 may provide by way of a table, a promotion schedule containing pre-determined promotional times, dates, and other relevant information. Such a table could be encrypted by the manufacturer 12, and decrypted by the retailer 10 or by a model-based system run by the retailer 10. The table may be segmented, such that the retailer 10 (or the retailer's model-based system) may be able to decrypt data only on a segment-by-segment basis. For example, segments could be assigned temporally (e.g., by days or weeks), by promotion type, or by some other designation. Thus, a retailer 10 may be able to decrypt manufacturer promotional information only during or near the time of the promotion's implementation. Such control over the ability to decrypt promotional information maintains the confidentiality of the promotional information. Specifically, all future promotions would remain encrypted, and therefore secret, until a time pre-determined by the manufacturer 12 or until the occurrence of some pre-determined triggering event. For added security, decryption keys for future segments (i.e., segments corresponding to promotions to be implemented in the future) may be passed to the retailer 10 on a just-in-time basis, such that the retailer 10 receives and is able to use the decryption keys only as they are needed.

Price determination parameters from the retailer 10, such as certain profit margins, internal promotions, discounts according to volume or velocity of sales, or taxes, are also used in the Promotion and Price computation model 28. It will be appreciated that such a promotion and pricing computation model 28 may involve a real-time system that communicates with point-of-sale (POS) devices for implementing the retail price 30. Additionally, it will be appreciated that the promotion and price computation model 28 may have the ability to transfer funds between the retailer 10 and the manufacturer 12 to facilitate the implementation of manufacturer-based promotions. Such transfers could take place using known techniques (e.g., the bank routing system, smart card technology, etc.). The price computation model 28 may be implemented by way of computer hardware or software, which may be programmable and capable of receiving, storing, and transmitting instructions regarding the promotions and pricing data.

Figure 4:
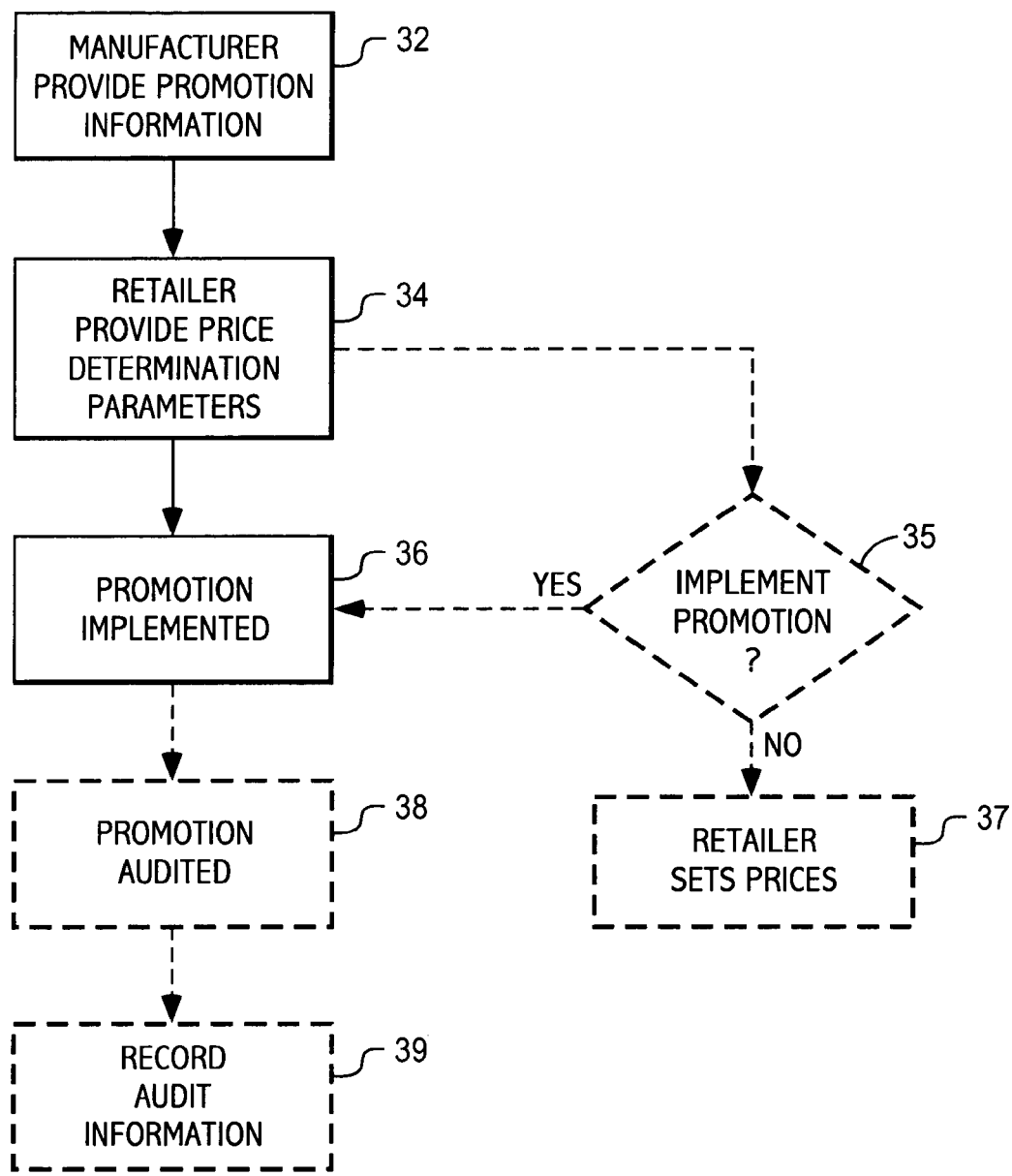
FIG. 4 is a general flow diagram of a model-based promotion and price computation method according to an embodiment.

In FIG. 4, a generalized technique for implementing a model-based promotion and price computation model, such as the one illustrated in FIG. 3, is shown in flow diagram form. This technique broadly outlines general steps used for such an implementation; more specific techniques are discussed subsequently in connection with FIGS. 7 and 8. By the technique shown in FIG. 4, price determination parameters from the retailer 10 and promotion information from the manufacturer 12 are provided in steps 32 and 34, respectively for calculation of a retail price 30 by a promotion and price computation model 28. Unless bypassed, the promotion, whose information is provided by the manufacturer in step 32, is automatically implemented in step 36 as part of the calculation of a retail price 30 (e.g., by way of a POS device, etc.).

However, an optional determination 35 may be made by the retailer 10 after providing price determination parameters in step 34 as to whether the manufacturer's promotion is to be implemented. Even where a promotional agreement applies, the retailer may make a determination to not implement a manufacturer's promotion, and instead manually set prices 37. Thus, as discussed previously, the retailer 10 may decide to bypass the automated implementation of manufacturer-based promotions by bypassing the promotion and price computation model 28 and manually setting retail prices 30. As shown by optional step 38, automatic auditing of promotions desired by the manufacturer 12 may be provided, and audit information may be recorded in optional step 39. The audit information, which could be viewed by the manufacturer 12, would indicate the retailer's 10 performance vis-a-vis its promotional contract with the manufacturer 12.

Figure 5:
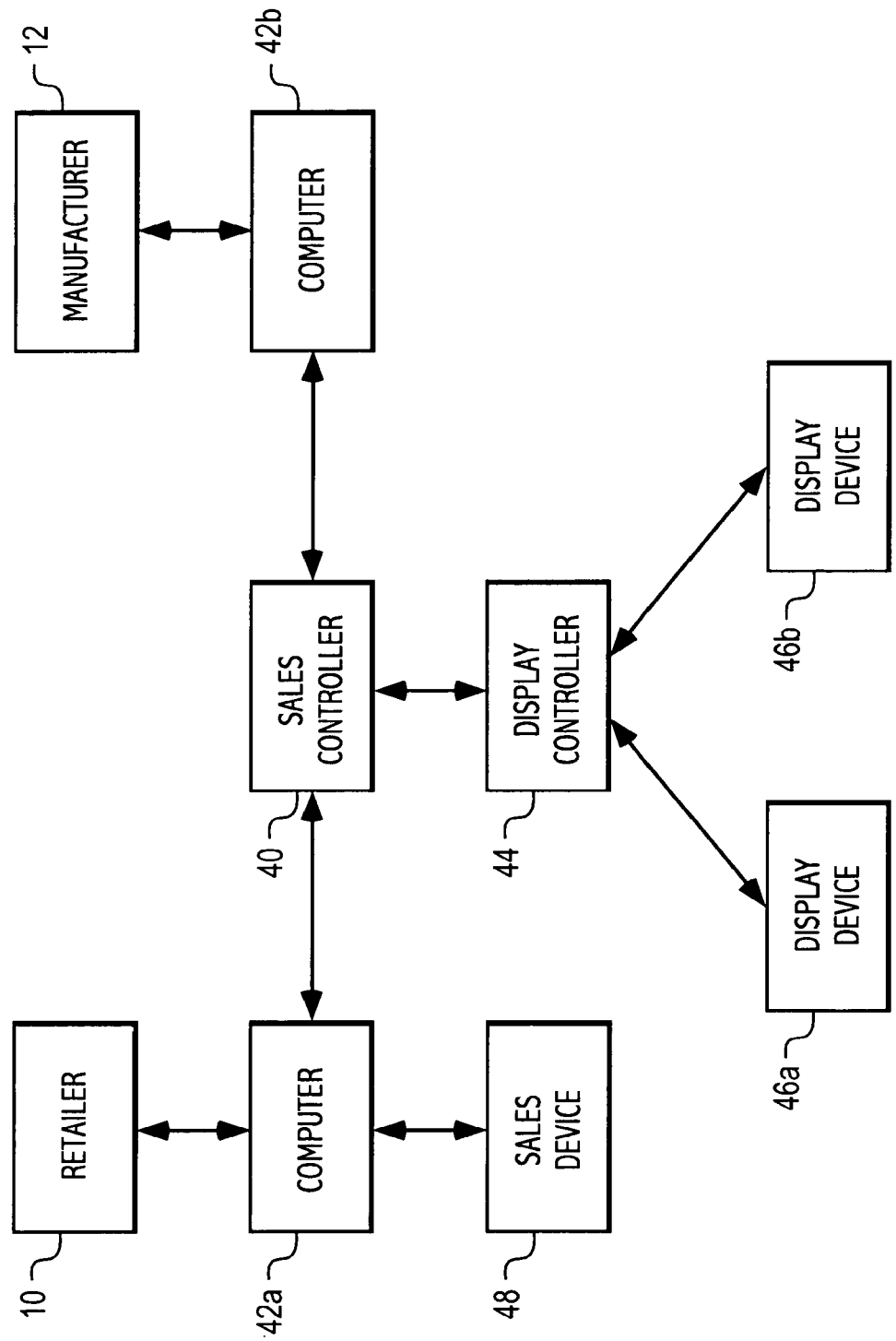
FIG. 5 is a block diagram of a system for implementing model-based promotion and price computation according to an embodiment.

The block diagram illustrated in FIG. 5 shows a system for implementing model-based promotion and price computation. In FIG. 5, the retailer 10 and manufacturer 12 are in communication with a sales controller 40 by way of computers 42a, 42b, respectively. Those skilled in the art will recognize that the term computer is used in its broadest sense in connection with the system of FIG. 5, and may include a wide variety of devices suitable for communicating the required data with the sales controller 40. The sales controller 40 controls a display controller 44, which is in communication with a plurality of display devices 46a, 46b. While only two display devices 46a, 46b are shown in FIG. 5, it will be appreciated by those skilled in the art that a plurality of display devices of any number could be controlled by way of a display controller 44. The display devices may be used to communicate a variety of information, as will be described below.

The display controller 44 may communicate with the various display devices 46a, 46b in a variety of manners. For example, the display controller 44 may communicate with the display devices 46a, 46b by way of a wireless transmission. Those skilled in the art will appreciate that the display controller 44 may communicate with a variety of display devices by way of a variety of techniques suitable for transmitting display instructions thereto over distances. Additional examples of suitable techniques for such transmissions may include, but are not limited to: traditional direct electrical connections, fiber optics, cables, free-space optical connections such as lasers and LED light, RF signals, electromagnetic induction coupling, and so forth. The display devices may be made up of a variety of display mechanisms suitable for displaying the retail price 30. For example, the display devices may comprise a conventional liquid crystal display (LCD) or a light emitting diode (LED) display. The display devices 46a, 46b, may also comprise less common types of displays, such as electro-phoretic devices, and the like.

The computer 42a by which the retailer 10 is in communication with the sales controller 40, may also be in communication with a sales device 48. This sales device 48 may be an electronic cash register device or other POS device. The sales device 48 can communicate directly with the sales controller 40 to ascertain any promotional information regarding items being sold. The sales controller 40 utilizes the promotion and pricing computation model 28, shown in FIG. 3, to calculate the retail price 30. As described above, however, the retailer 10 may override the sales controller 40 to manually set the retail price 30.

The sales controller 40 may also be used to provide the retail price 30 to be displayed on each of the display devices 46a, 46b by way of the display controller 44. It will be recognized by those skilled in the art that the sales controller 40 may either be or form part of a computer or group of computers. Additionally, it is contemplated that the sales controller 40 could comprise exclusively software that resides on one or more computers. The sales controller 40 may be owned by the retailer 10, the manufacturer 12, or an independent third party (e.g., an independent auditor). A single sales controller 40 could be used to control multiple display controllers 44 to display multiple retail prices 30 associated with many products. The retail prices 30 may be developed from multiple pricing models 28. Alternatively, a single display controller 44 could be used to display retail prices 30 associated with multiple pricing models 28.

Preferably, a retailer 10 and a manufacturer 12 may remotely contribute, by way of their computers 42a, 42b, to the promotion and price computation model 28, which is implemented by the sales controller 40. The sales controller 40 then communicates the retail price 30, calculated by the model 28 that is to be displayed on the display devices 46a, 46b to the display controller 44. Any promotional information needed by the electronic cash register or other sales device 48 is also provided by the sales controller 40. The sales controller 40 may be used to pass retail pricing information to an electronic cash register or other sales device 48 by way of electronically stored price look-up tables. The retail pricing information from these look-up tables may also be passed to the display controller 44 to indicate the proper price that should be displayed by each of the display devices 46a, 46b. It should be noted that the retail pricing information stored in the look-up tables reflects prices after the implementation of any promotions or markdowns by a retailer, and is used only for charging the customer and not for price determination purposes. Additionally, the sales controller 40 could be used for other functions, such as passing auditing information to the manufacturer 12 with respect to a manufacturer-based promotion (e.g., by way of the computer 42b), or implementing monitoring promotions by multiple manufacturers, for example. It will be understood by those skilled in the art that prudent operation in an environment involving access by multiple manufacturers would require appropriate provisions to protect each manufacturer's proprietary, confidential, and competitive information.

The sales controller 40 may adjust the promotion and price computation model 28 according to a variety of parameters. For example, promotion information regarding a number of different promotions may be provided by the manufacturer 12 and used by the sales controller 40 to calculate the retail price 30 of goods. Additionally, information regarding other parameters such as velocity of sales could be monitored by way of the sales device 48, and could be communicated to the sales controller 40 by way of the retailer's computer 42a. The sales controller 40 could, in turn, implement a promotion based upon the received information. For example, a promotion could be implemented by the sales controller 40 once a pre-determined velocity of sales threshold has been met or exceeded. Retail prices reflecting this new promotion would be instantly displayed on the display devices 46a, 46b, by communicating the promotional pricing to the display controller 44. Also, the sales device 48 would be notified of the new promotional pricing by changing its price look up labels, or otherwise communicating a price change. Other parameters may also be monitored by the sales controller 40, such as the total number of devices sold, profitability to the retailer of items sold, importance placed on the goods either by the retailer or manufacturer, temporal considerations (e.g., time of day, time of year, etc.), inventory tracking considerations, and so on. These parameters could be used by the sales controller 40 as inputs to the promotion and price computation model 28, for use in calculating the retail price 30 displayed by the display devices 46a, 46b and charged at the sales devices 48.

Because of the real-time connection shared by the retailer 10 and manufacturer 12 with the sales controller 40, a variety of complex promotional schemas may be developed and implemented whereby promotional and price data can be dynamically calculated by the sales controller 40 and updated by the display controller 44 (depending on the retailer's approval, or a level of trust granted to the sales controller 40 by the retailer 10). Additionally, the retailer 10 and manufacturer 12 may also be permitted to provide other kinds of information (i.e., aside from promotional and price information) to the display devices 46a, 46b, to be displayed in a retail setting. For example, advertising information, ingredient lists, nutritional information, historical information, and all other manner of information may be displayed by way of the display devices 46a, 46b, as provided by the display controller 44. It will be appreciated by those skilled in the art that the system illustrated in FIG. 5 may be situated in multiple and diverse geographic locations connected by wired or wireless telephony. It will also be appreciated that in addition to providing real-time or near real-time information, information may be provided on an as-needed, or as requested basis, such as known just-in-time techniques or the like.

Figure 6:
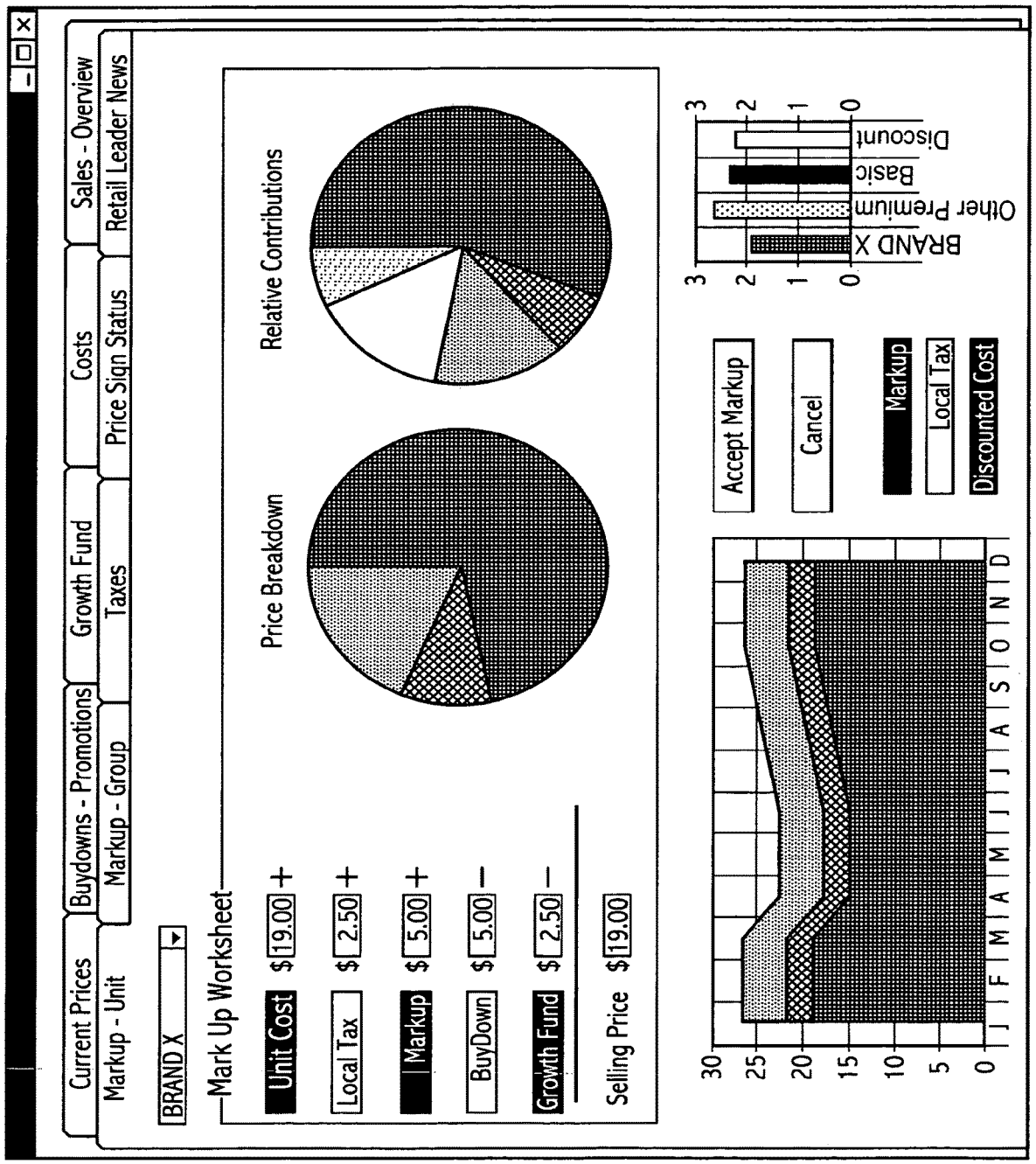
FIG. 6 is a screen shot of a computer window according to an embodiment.

In FIG. 6, a screen shot of a computer window that may be used is shown. Specifically, the window shown in FIG. 6 may be used on either of the computers 42a, 42b shown in the system of FIG. 5. This computer window shows the breakdown of costs associated with a particular product that contribute to the product's retail price 30. The window shown in FIG. 6 can be used to show costs of any goods to be sold by a retailer 10.

On the left hand side of the window shown in FIG. 6, a breakdown of the costs that contribute to the retail price 30 of an individual unit of retail goods is shown. The first amount is the "unit cost," which is the retailer's wholesale cost for each retail sales unit. In the case shown in FIG. 6, this wholesale cost is $19.00. In addition to the wholesale cost of the retail unit, the "local tax," which in this case is $2.50, is added to the wholesale cost of the unit. This local tax may include, for example, local sales tax, or any special taxes associated with the goods (e.g., gasoline tax, food tax, anti-smoking tax etc.). Additionally, a retailer markup is added to the overall cost of the unit. In the case shown in FIG. 5, the retailer has marked up the retail price of the unit by $5.00. This retailer mark-up may be adjusted to provide a retailer with a desired profit margin.

Each of the costs discussed above, which are added to the overall price of the goods being sold, are under the control of the retailer 10, and may be provided, for example, to the sales controller 40 as price determination parameters for computing a pricing model 28 in determining a retail price 30. The retailer 10 may input these values directly, or may input information (e.g., tax rates) used by a price management program resident on the computer 42a or by the sales controller 40 to compute the actual value (e.g., tax values). Additionally, the wholesale cost of any goods could be automatically input on behalf of the retailer 10 by way of a computerized inventory system that tracks such amounts.

In addition to the amounts added to determine the retail price 30, promotions may allow for deductions in the overall cost of the goods in determining the retail price 30. One such deduction, which is under the retailer's control, and thus forms a price determination parameter from the retailer 10, is the "growth fund" entry. In the case illustrated in FIG. 6, the growth fund amount is a deduction of $2.50 per unit. The manufacturer 12 may provide the retailer 10 with certain discretionary promotional funds, called growth funds, that allow a retailer 10 to implement promotions, without affecting the retailer's profit. Such promotions could be run at the discretion of the retailer, or within certain parameters prescribed by the manufacturer 12. One advantage of such a growth fund is that it allows a retailer to run promotions independently of promotions sponsored by the manufacturer 12. Thus, local retailers, who better understand their local markets, may tailor promotions to their markets' needs.

Therefore, as can be seen in connection with FIG. 6, a retailer determines a product's retail price 30. Additionally, as shown in FIG. 6, a manufacturer may institute a promotion by way of a "buydown." For example, in FIG. 6, the buydown amount is $5.00 per unit. This means that the manufacturer wishes to reduce the overall selling price, or the retail price 30, of each retail unit by the buydown amount (i.e., by $5.00 unit), and pass along those savings to the consumer. The buydown amount is an amount that will be paid from the manufacturer 12 to the retailer 10 to subsidize the reduction in the retail price 30. Advantageously, the manufacturer 12 is assured that either the promotion will be automatically implemented by way of the sales controller 40, or an audit report of the retailer's failure to implement the manufacturer's promotion will reveal the failure, and serve to notify the manufacturer that the retailer should not be paid the subsidy of $5.00 per unit. Therefore, the manufacturer 12 is relatively certain that when he pays the buydown promotion subsidy to the retailer 10 that the promotional subsidy has been passed along to the consumer by way of a discount in the retail price 30.

The computer window shown in FIG. 6 also shows various graphs that are used to analyze the cost of goods. For example, at the bottom of the window, the various price elements are mapped over one year's time. Additionally, two pie charts are shown that breakdown the retail price 30 into the various components. The "Price Breakdown" pie chart illustrates the costs contributing to the overall retail price 30 of the goods. The "Relative Contributions" pie chart indicates the absolute value, or magnitude, of the contributions and deductions of each of the parameters and promotions shown at the left to the overall selling price of the goods.

It will be appreciated by those skilled in the art that the window shown in FIG. 6 may be implemented on a variety of computers either in its present form, or in a more simplified form. For example, the computer window shown in FIG. 6 is designed for a Microsoft Windows-based operating system platform; however, a window having similar functionality could be adapted for use in a variety of operating systems, such as the Mac OS, UNIX, and less sophisticated operating systems such as Windows CE, Palm OS, and the like. Additionally, although the window in FIG. 6 shows the retail price breakdown for only a single product, it is contemplated that multiple products, or multiple brand categories, could be displayed in a similar screen with appropriate values for each product or brand.

In accordance with one embodiment, when the "accept markup" button is depressed by the user, the prices shown at the left, including any changes made by the retailer 10, are transmitted to look-up tables used by the sales device 48, and to the display controller 44 via the sales controller 40. However, in accordance with an alternative embodiment, an additional step may be required to change selling prices by transferring the revised price look up table to the sales device 48.

Those skilled in the art will recognize that additional screens may be shown within the window of FIG. 6. For example, the screen shown in FIG. 6 comes under the tab "Markup-Unit." However, multiple other tabs exist for changing other amounts or information associated with other amounts. For example, a "Taxes" tab is provided to change information associated with taxes. Likewise, various other tabs are provided for changing other parameters associated with the retail price 30 of the goods being sold. Those skilled in the art will recognize that the structure of each of the screens associated with these tabs may vary according to design choices of those skilled in the art. Information associated with each of the tabs may be altered by selecting the screens associated with the tabs and changing the information transmitted to the sales controller 40.

Figure 7A:
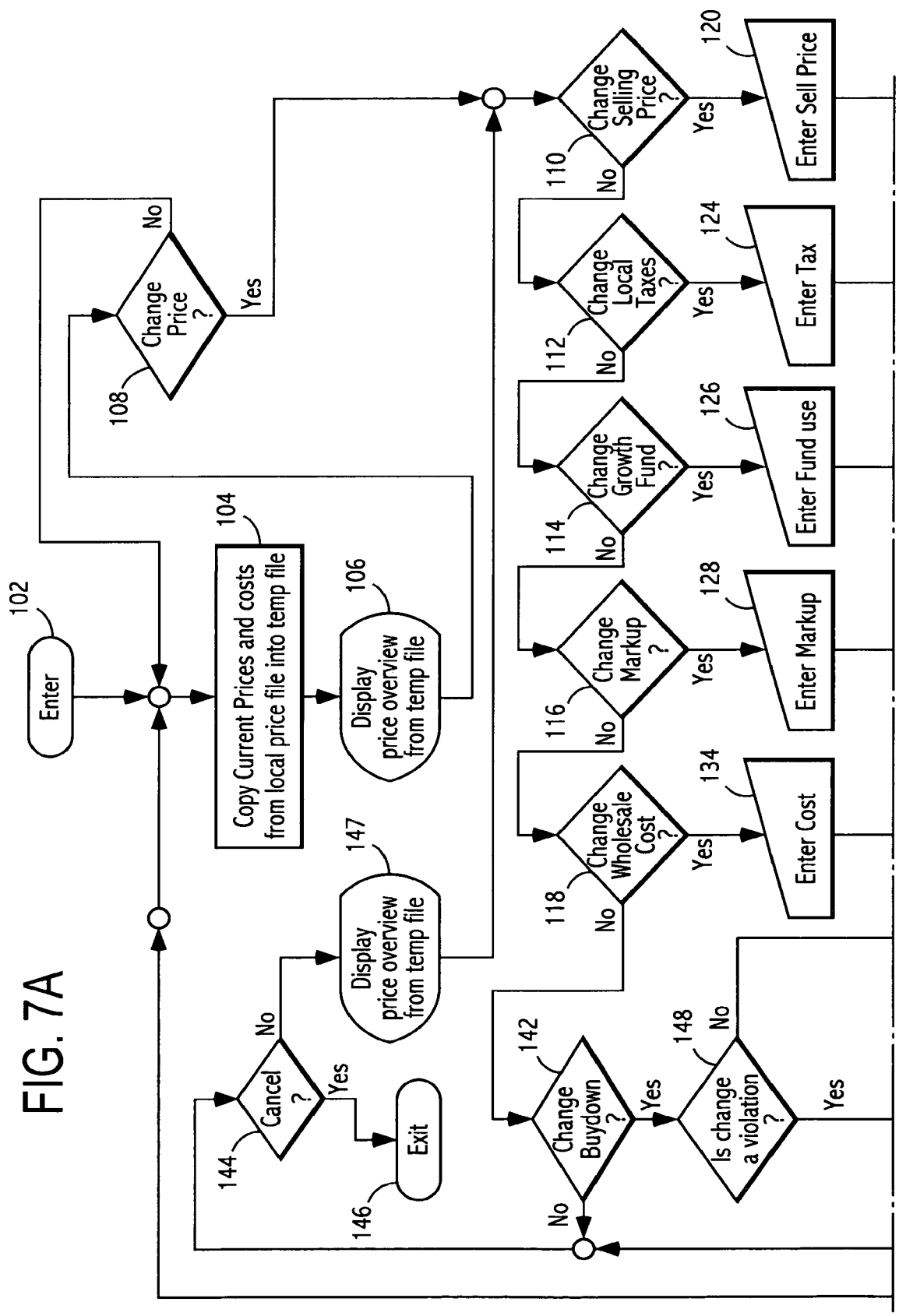
FIGS. 7A and 7B are a flow diagram of a model-based calculation technique according to an embodiment.
Figure 7B:
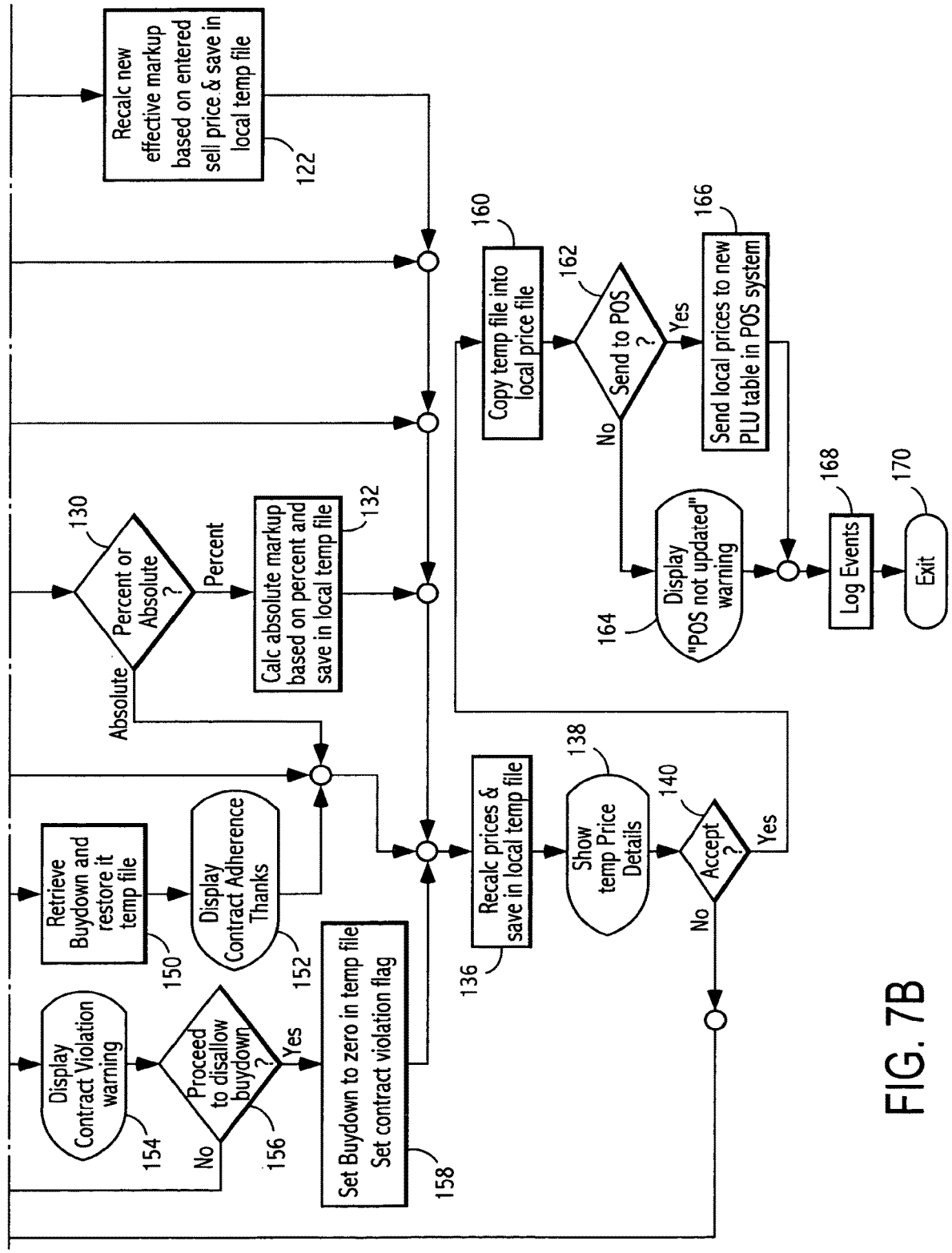

FIG. 7 illustrates a flow chart of the retail price calculation technique used by the model-base promotion and price computation system, in accordance with an embodiment. It is by way of the technique illustrated in FIG. 7 that the promotion and price computation model 28 calculates retail prices 30. The technique illustrated in FIG. 7 is, therefore, the technique utilized by the sales controller 40 of the system shown in FIG. 5, in accordance with an exemplary embodiment. Those skilled in the art will recognize that the particular implementation of the technique described in FIG. 7 may be varied.

In the technique illustrated in FIG. 7, a retailer begins at the enter step 102 and current prices and costs are copied from a local price file into a temporary file 104. The current prices in the local price file are prices previously determined by the retailer 10. Thus, if no prices have been previously determined, the system may be initialized using values of zero for the current prices. A general overview of the prices stored in the temporary file is displayed to the retailer 10 in step 106. This may be accomplished, for example, by way of the retailer's computer 42a. A decision is made 108 regarding whether or not the retail price of an item is to change, and this determination is made for each item. If the price is not to change for a specific item, then the system waits until the price of an item is to be changed. Once it is determined that the price of an item is to be changed, then individual decisions regarding each portion of the price are made. Specifically, decisions are made regarding whether to change the selling price 110, whether to change the taxes 112, whether to change the growth fund 114, whether to change the retailer's markup 116, and whether to change the wholesale cost 118. If any of the items are not changed, then the system prompts the retailer for a decision as to whether or not the next item on the list will be changed. However, if any of the pricing parameters are changed, then the new amounts, which contribute to the overall retail price 30, are entered.

For example, if it is determined that the selling price is to be changed in step 110, then a new selling price is entered in step 120. If this is the case, then the effective markup, based on the newly entered selling price, is recalculated and stored in the local temporary file containing the price overview in step 122. Likewise, if the taxes are to be changed, then the new tax amounts are entered in step 124. Similarly, if the growth fund amounts are to be changed in step 114 then the new growth fund amounts are entered in step 126. If the retailer's markup is to be changed in step 116, then the new markup amount is entered in step 128, and the system then determines in step 130 whether the new markup value is a percentage or an absolute value. If the new markup value is a percentage, then the absolute markup value is calculated and stored in the local temporary file in step 132; otherwise, the absolute value is processed directly by the system. If the wholesale cost of the item has changed, as determined in step 118, then the new wholesale cost is entered in step 134. Once each of these price determination parameters has been entered, then the retail price 30 is recalculated and saved in the local temporary file in step 136. Details regarding the prices stored in the temporary file are shown to the retailer 10 in step 138, and the retailer 10 is given a choice as to whether or not to accept these values in step 140. If the retailer 10 accepts the price changes in step 142, then the system continues in step 160, as discussed below. If, however, the retailer 10 does not accept the new prices (now stored in the temporary file), then the system erases the values stored in the temporary file and begins the process again by starting over at step 104.

Although each of the changes to amounts contributing to the retail price 30 are shown in serial fashion in the flow diagram, it will be understood by those skilled in the art that these amounts could be represented in a parallel fashion. In such a situation, the system would automatically prompt the retailer 10 for input regarding each of the decisions of price determination parameters from the retailer 10, regardless of the retailer's actions with respect to other parameters.

Similarly to the changes in the retailer's price determination parameters, the technique shown in FIG. 7 allows for changes to be entered regarding manufacturer promotion information. Specifically, in the case of a buydown promotion, a decision is made 142 regarding whether or not to change the buydown amount that discounts the retail price of the goods being sold. If it is determined in step 142 that the buydown amount will not be changed (which in accordance with the embodiment shown is the same as not changing any parameter), then the retailer 10 may be prompted to decide if he wishes to cancel the price calculation technique in step 144. If the retailer wishes to cancel, then he may exit the program in step 146. If, however, the user does not wish to cancel, then an overview of the prices shown in the temporary file are displayed in step 147, and the retailer is again prompted regarding various changes in the price determination parameters and promotion information contributing to the retail price of the goods.

If, on the other hand, it is determined in step 142 that the buydown amount is to be changed, then a second determination is made 148 regarding whether or not the change in the buydown information is a violation of the contract between the retailer 10 and the manufacturer 12. If it is determined in step 148 that the change is not a violation (e.g., the buydown change implements a promotion agreed to by the manufacturer) then the buydown amount is retrieved and restored to the temporary file in step 150 and a contract adherence "Thank You" message is displayed in step 152. The system then proceeds to recalculate retail prices and save the prices in a temporary file in step 136, shows the temporary price details in step 138, and queries the retailer 10 whether or not to accept the changes 140.

In contrast, if it is determined in step 148 that the change in the buydown amount is a violation of the contract between the retailer 10 and the manufacturer 12 (e.g., a retailer does not wish to implement a buydown promotion from the manufacturer), then a contract violation warning screen is displayed in step 154. The retailer 10 is then queried again in step 156 regarding whether he wishes to continue to change the buydown amount in violation of the contract (i.e., in this case by disallowing a manufacturer's buydown promotion). If the retailer 10 does not wish to violate the contract, then the retailer 10 is asked whether or not he wishes to cancel in step 144, and may then either cancel the new price calculation and exit in step 146, or again be presented with the option of changing the various amounts that determine the retail price 30. However, if the user decides in step 156 to proceed to violate the contract (i.e., in this case by disallowing the buydown promotion from the manufacturer), then the buydown amount is changed in the contract-violating manner in step 158, and a contract violation flag is set and stored. This contract violation flag can later be detected by the manufacturer 12, for example, in an audit of the retailer's records using the system. Thus, the manufacturer 12 will know that the contract has been violated and the buydown promotion has not been properly implemented, and will therefore know not to pay the corresponding buydown amount to the retailer 10.

Once the buydown amount has been determined, either by compliance with the contract, or otherwise, the prices are recalculated and stored in a local temporary file 136, and the temporary price details are displayed 138. Again, the retailer 10 has an opportunity to accept or decline the prices in step 140. If the retailer 10 accepts the prices stored in the temporary file, then the prices contained therein are copied into a local price file in step 160.

A determination is then made in step 162, regarding whether the prices stored in the local price file in step 160 are to be sent to the sales device 48 (i.e., in this case to a POS device). If the prices in the local price file are not sent to the sales device, then a warning is displayed in step 164, informing the retailer 10 that the sales device's prices have not been updated. Alternatively, if the prices from the local price file are sent to the sales device 48, then these prices are entered in a new price look up (PLU) table in the system of the sales device 48 in step 166. Prior to termination of the technique shown in FIG. 7, all events are logged in step 168, and then the technique is exited in step 170.

Those skilled in the art will recognize that multiple changes to the technique shown in FIG. 7 may be made. One example of such a change may include adding additional loops after warning screens, allowing for multiple warnings, or additional determinations to be made after each warning screen, such as the warning screen shown in step 164, for example. By way of the technique shown in FIG. 7, the promotion and price computation model 28 is developed within the sales controller 40. Some of the amounts may be changed according to the technique shown in FIG. 7 may be changed by way of a computer window, such as the computer window shown in FIG. 6, for example.

Figure 8:
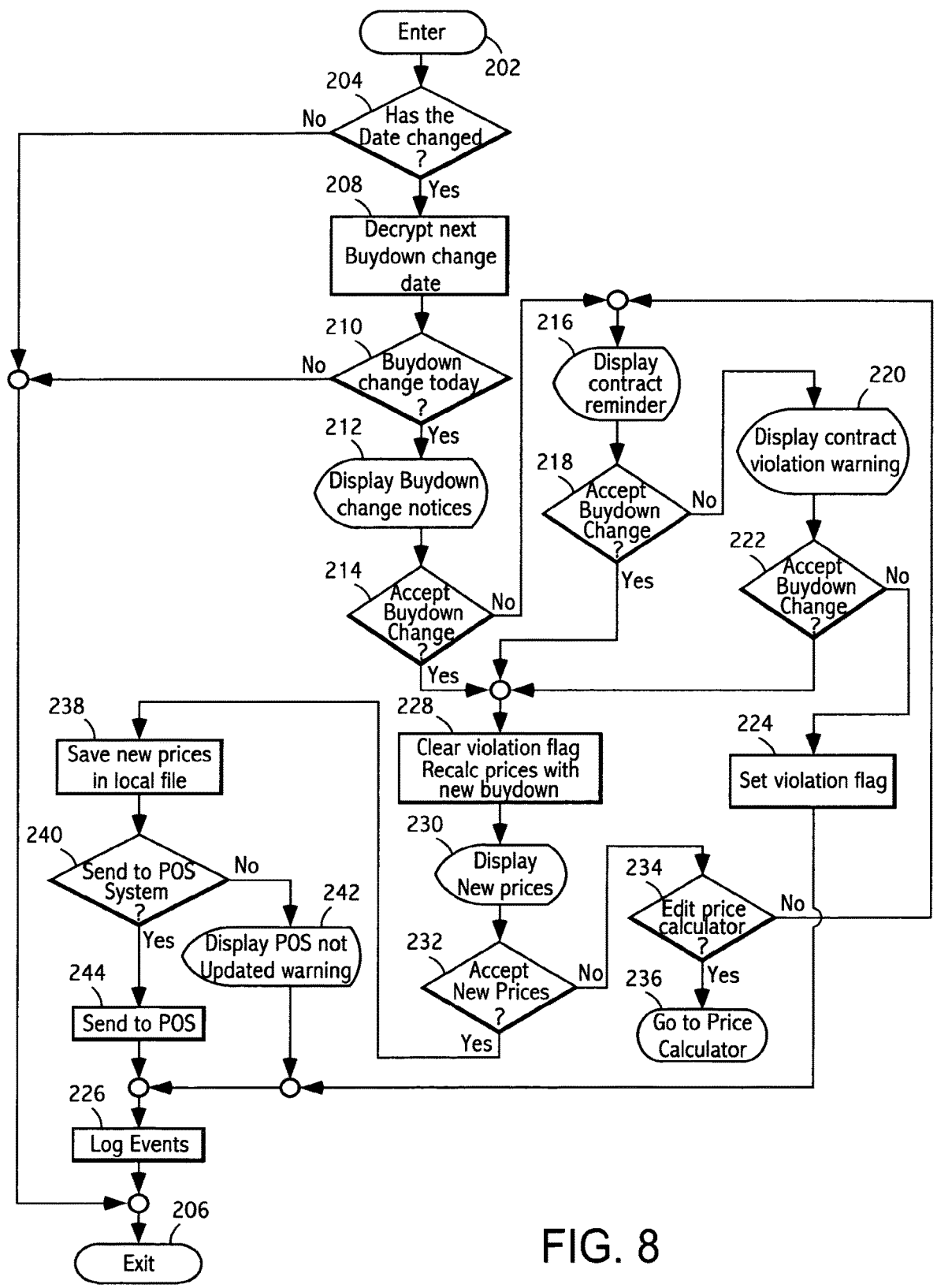
FIG. 8 is a flow diagram of a model-based price management technique according to an embodiment.

In FIG. 8, a flowchart illustrating the technique associated with acceptance of a buydown promotion from a manufacturer 12 is shown, in accordance with an exemplary embodiment. The technique shown in FIG. 8 may be used when promotion information, in the form of a buydown promotion, is received from the manufacturer 12 to be entered in the promotion and price computation model 28. As stated above, although these promotions have been contracted for between the retailer 10 and the manufacturer 12, the retailer 10 is provided one or more opportunities to refuse the buydown promotion, and to thereby violate the contract. It will be recognized by those skilled in the art that it is possible to automatically implement the promotion information, such as buydown promotions, received from the manufacturer 12 into the promotion and price computation model 28 without the consent of the retailer 10. However, those skilled in the retail arts will also recognize that in many cases it is prudent and even desirable to allow the full control that comes to the retailer 10 by allowing the retailer to refuse such promotions, as shown in FIG. 8, for example.

Therefore, the technique shown in FIG. 8 may be automatically run on the retailer's computer 42a. First, the program begins at step 202, and a query is made in step 204 regarding whether or not the date has changed since it last ran. If the date has not changed, then the program is exited in step 206. However, if the date has changed, then encrypted information regarding the date of the next buydown promotion, or the next date on which the buydown information must be changed, is decrypted in step 208. This decrypted information is then used to determine whether or not the buydown information is to be changed 210. If the information is not to change, then the technique ends in step 206. However, if the buydown information is to be changed, then a buydown change notice is displayed in step 212.

Once the buydown change notice has been displayed to the retailer 10 in step 212, a determination is made by the retailer 10 in step 214 as to whether or not to accept the buydown change. If the retailer 10 decides not to accept the buydown change in step 214, then a contract reminder is displayed in step 216, and the user is again queried in step 218 whether he wishes to accept the buydown change. If the user again refuses to accept the change, a contract violation warning is displayed in step 220, and the retailer 10 is queried for a third time whether he wishes to accept the buydown change in step 222. If, after this third query, the user refuses to accept the buydown change, a violation flag is set in step 224, the events and the violation flag are logged in step 226, and the technique ends in step 206.

If, on the other hand, the retailer 10 agrees after any one of the three queries 214, 218, 222, to accept the pre-agreed buydown change, then the violation flag is cleared, and retail prices 30 are recalculated using the new buydown amount in step 228. The new retail prices 30 are then displayed in step 230 and the retailer 10 is queried as to whether to accept the new prices in step 232. If the new prices are not accepted in step 232, a query is made regarding whether the retailer 10 wishes to edit the price calculator in step 234. If not, the retailer 10 is reminded of his contract obligations in step 216. However, if the user wishes to edit the price calculator in step 234, he is then presented with the option to change the price calculator in step 236. This may include, for example, changing prices by way of the computer window shown in FIG. 6, or by way of the technique shown in FIG. 7.

If the retailer 10 accepts the new prices in step 232, the new prices are saved in a local file in step 238. The retailer 10 is then queried as to whether to send the new prices to the sales device 48 (i.e., in this case the POS device) in step 240. If the user elects not to send the prices to the sales device 48, then a warning screen is displayed in step 242, the events are logged in step 226, and the program is exited in step 206. On the other hand, if the user elects to send the price information stored in the local file to the sales device 48 in step 240, then the information is sent in step 244 to the sales device 48 (i.e., in this case to the POS system). All of the events are then logged in step 226, and the program ends in step 206.

As with the technique illustrated in FIG. 7, the technique illustrated in FIG. 8 may be varied in a number of ways and those skilled in the art will recognize that the flow chart in FIG. 8 could be altered in numerous ways. For example, the number and type of warning messages provided after undesirable decisions by a retailer 10 could be changed without altering the underlying functionality of the system. Likewise, both techniques shown in FIGS. 7 and 8 could be modified to be used with multiple manufacturers 12, providing promotion information regarding a multitude of products to a single retailer 10. Those skilled in the retail arts will recognize that the prudent use of the system would require such a multi-manufacturer use to include appropriate provisions to protect each manufacturer's proprietary, confidential, and competitive information from disclosure.

Figure 9:
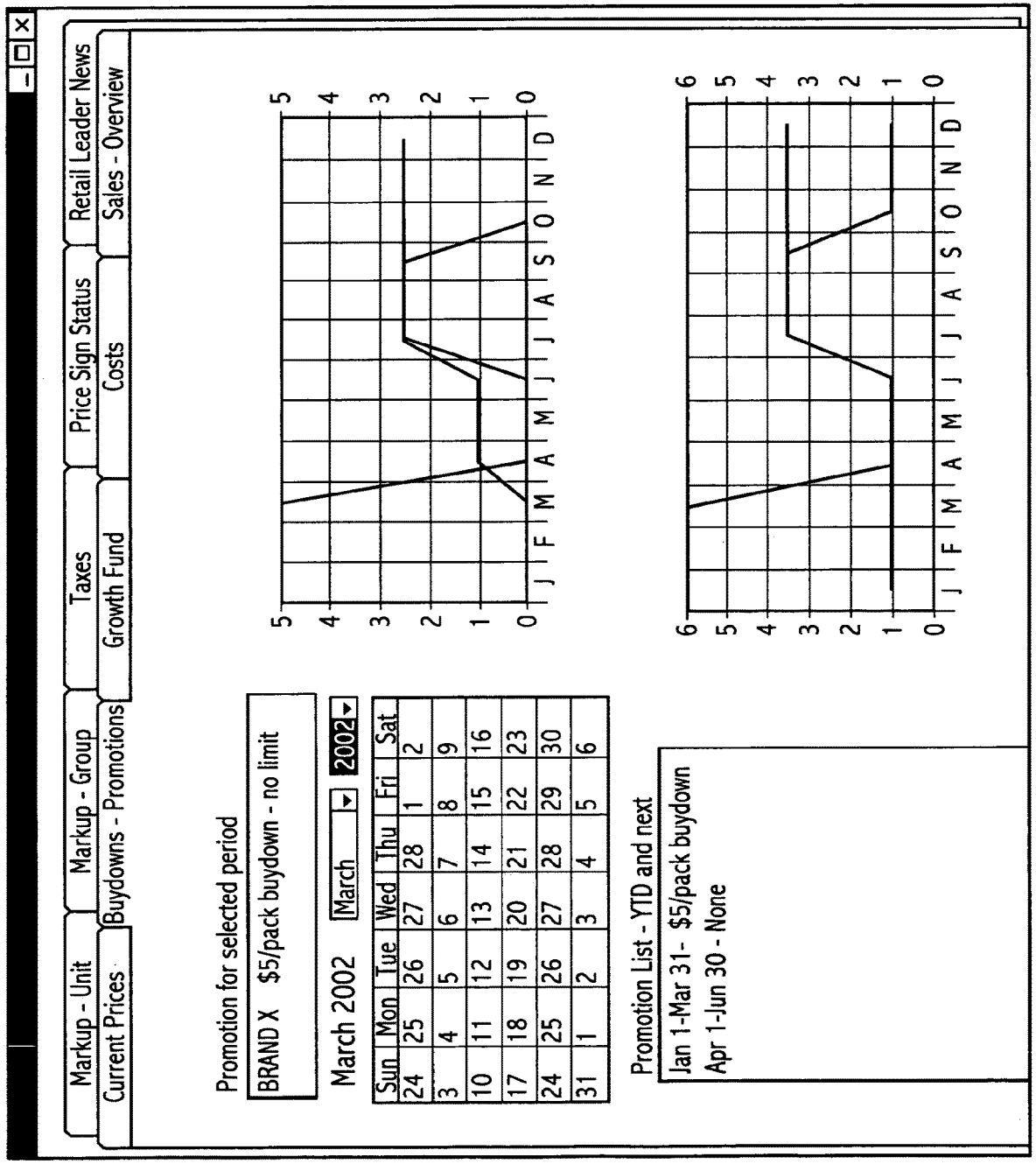
FIG. 9 is a screen shot of a computer window according to an embodiment.
Figure 10:
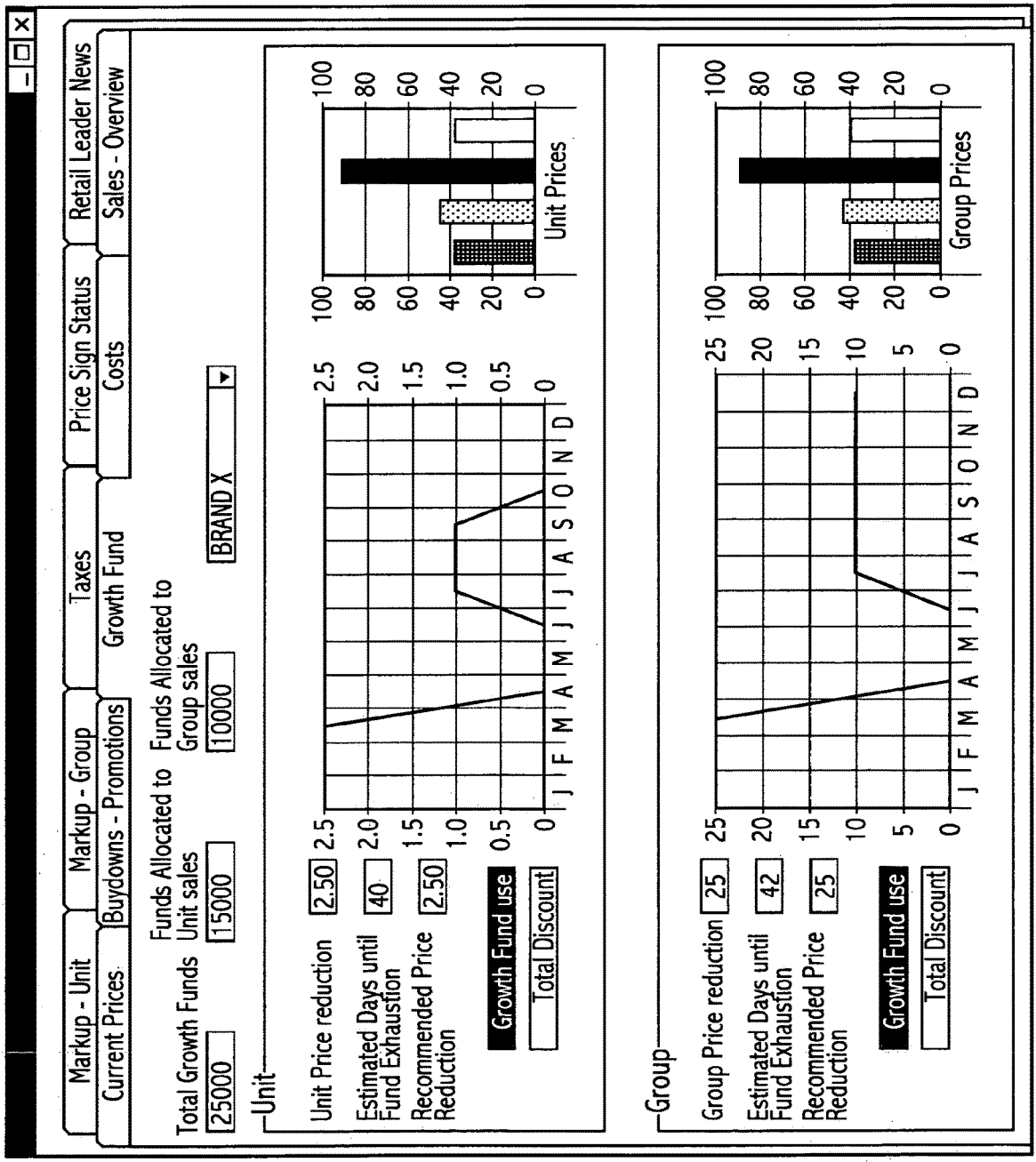
FIG. 10 is a screen shot of a computer window according to an embodiment.

FIGS. 9 and 10 show additional screen shots of a price display program that could be used on either the retailer's computer 42a or the manufacturer's computer 42b, in accordance with an exemplary embodiment. In FIG. 9, an exemplary screen regarding the manufacturer-based buydown promotions is shown. In this screen, various time periods may be selected and promotions for those time periods may be displayed. Also, a list of the promotions of the past year is shown, along with two graphs illustrating the amounts of the buydown promotions implemented during the previous year.

The screen shot shown in FIG. 10 relates to a retailer's use of the growth fund provided by the manufacturer 12 to enable the retailer 10 to implement promotions at the retailer's discretion. For each product selected, the total growth funds are shown, and those funds allocated to sales of particular quantities of goods (e.g., units and groups of units) are also shown. Graphs for each of these quantities are shown, which each estimate the days left until exhaustion of the fund at the current price reduction rate. Also, a recommendation regarding the price reduction can be made. Two graphs are shown illustrating the use of the growth fund for each of the sales quantities over the previous year.

It will be recognized that the computer windows shown in the screen shots of FIGS. 9 and 10 may be varied according to the needs of a particular model-based system. For example, if computers 42a, 42b having limited memory and/or limited display capabilities are used, the capability for calculating and displaying graphs may be forfeited entirely. Furthermore, although the windows shown in these figures are specific to the Microsoft Windows operating system platform, those skilled in the art will recognize that similar displays could be utilized with various operating systems, such as the Mac OS or UNIX, or portable operating systems, such as Windows CE, Palm OS, or the like. Additionally, depending upon the complexity of the computers 42a, 42b, used in the system, the complexity of the computer windows, and the functionality associated therewith, may be either reduced or increased, according to the system requirements and the desires of the retailer 10 and the manufacturer 12.

The system described herein is particularly advantageous in its ability to display and implement real-time promotion and price information on a variety of remotely located display devices. However, the system is also advantageous in that the real-time information generated by way of the system may be used for auditing purpose. For example, in the system illustrated in FIG. 5, the manufacturer 12 may instantly and instantaneously verify the success of a promotion to be implemented at a given time. For example, the velocity of sales or number of sales can be instantly and continuously monitored as the sales devices' 48 data regarding sales may be instantly relayed to the manufacturer 12 via the sales controller 40. Additionally, because the manufacturer 12 has instant access to sales and promotional information of its products by way of the sales controller 40, the manufacturer 12 is assured that its desired promotions will be implemented, and can verify such via the sales controller 40, which is in communication with the sales device 48 and can report information regarding actual sales and actual sale prices of its products. The manufacturer 12 is also assured that the quantity and velocity of sales of products currently in promotion may be accurately monitored and reported via the sales controller 40.

Accordingly, a system and method have been described whereby both retailers and manufacturers may contribute to a promotion and price computation model, from which a retail price is set. The system and method allow a manufacturer to pass promotion information to the price computation model, which according to an exemplary embodiment the retailer may or may not bypass, at his discretion, for implementation in the retail price of goods. The system also allows for real-time auditing capabilities, whereby a manufacturer may be assured that promotions desirous to be implemented have in fact been implemented. Additionally, the system exhibits an ability to update and modify promotion and pricing information by the manufacturer and retailer respectively on a nearly instantaneous basis in real-time or near real-time at a number of remote locations, according to one or more promotion and price computation models. Sales information may be tracked in real-time by a sales device, such as an electronic cash register, which is in constant real-time communication with a sales controller, with which both a retailer and manufacturer may communicate.

It will be appreciated by those skilled in the art that the system and method can be embodied in other specific forms without departing from the spirit or essential characteristics thereof. For example, the system and method have been described in the context of a sales controller that implements a retail price as set by the retailer associated with a promotion and price computation model by way of a display controller. However, the system and method could make use of any combination of multiple sales controllers, display controllers, promotion and price computation models, or retail prices, and could be used to provide information other than pricing information, such as any information agreed upon by the manufacturer and retailer in the promotional agreement. Additionally, the system could be readily adapted to include well known technologies, such as smart cards for storing and transmitting money and/or cryptographic keys, and other such devices. The presently disclosed embodiments are, therefore, considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for monitoring a contractual agreement between a retailer and a manufacturer over a network via a processing device configured to execute a model-based promotion and price computation model, the method comprising:

in a processor of the processing device
monitoring, in real-time, a plurality of sales parameters and promotion information, the plurality of sales parameters associated with the retailer and received in real-time over the network, and the promotion information associated with the manufacturer;
receiving, over the network and upon occurrence of a triggering event, a key for decrypting a data segment among a plurality of data segments, wherein a plurality of encrypted sales promotions are stored as the plurality of data segments;

decrypting at least one of the plurality of encrypted sales promotions based on the triggering event and the key; and determining whether a current sales promotion identified in the promotion information should be implemented by comparing at least one of the plurality of sales parameters to a threshold, wherein the current sales promotion is included in the at least one of a plurality of encrypted sales promotions that are decrypted;

in response to determining that the current sales promotion is to be implemented evaluating retailer parameters for implementing the current sales promotion and calculating, in real-time, an adjusted retail price of goods for the current sales promotion to be implemented based on the promotion information, transmitting the adjusted retail price of goods over the network for immediate price adjustment at the retailer, and auditing the plurality of sales parameters in real-time to determine whether the retailer has implemented the current sales promotion and whether the implementation is under manufacturer-specified criteria.

2. The method of claim 1, further comprising:

calculating, via the processor, an initial retail price of goods based on the promotion information and sales parameters among the plurality of sales parameters.

3. The method of claim 1, wherein the plurality of sales parameters includes at least one of velocity of sales by the retailer, total number of goods sold by the retailer, profitability to the retailer of items sold, a value placed on goods by the retailer or the manufacturer, date, time, or inventory data.

4. The method of claim 1, wherein the processor is configured communicate with at least one remote display device at the retailer, and the method includes transmitting the adjusted retail price of goods to a display controller for displaying the adjusted retail price of goods or information related to the adjusted retail price of goods on the at least one remote display device.

5. A processing device for monitoring a contractual agreement over a network, the processing device comprising:

a communication interface for communicating information including pricing data associated with at least a retailer over the network; and a processor configured to monitor a plurality of real-time retail sales parameters and promotion information received via the communication interface, receive, upon occurrence of a triggering event, a key for decrypting a data segment from among a plurality of data segments, wherein a plurality of encrypted sales promotions are stored as the plurality of data segments, decrypt at least one of the plurality of encrypted sales promotions based on the triggering event and the key, and determine whether a current sales promotion should be implemented by comparing at least one of the plurality of real-time retail sales parameters to a threshold, wherein the current sales promotion is included in the at least one of the plurality of encrypted sales promotions that are decrypted; and in response to determining that the current sales promotion is to be implemented evaluate retailer parameters for implementing the current sales promotion and calculate an adjusted retail price of goods for the current sales promotion to be implemented in real-time based on at least one of the plurality of real-time retail sales parameters and based on the promotion information, and audit the current sales promotion based on the plurality of real-time retail sales parameters to determine whether the retailer has implemented the current sales promotion and whether the implementation is under manufacturer-specified criteria.

6. The processing device of claim 5, wherein the plurality of real-time retail sales parameters includes at least one of velocity of sales by the retailer, total number of goods sold by the retailer, profitability to the retailer of items sold, a value placed on goods by the retailer or a manufacturer, date, time, or inventory data.

7. The processing device of claim 5, wherein the communication interface is configured to transmit pricing data to at least one display controller over the network for immediate display of pricing data or information related to the pricing data on at least one remote display device of the retailer.

8. The processing device of claim 5, wherein the communication interface is at least one of a wireless or wired network interface.

9. The processing device of claim 5, wherein the processor is configured to transfer funds between a retailer computing device of the retailer and a manufacturer computing device of a manufacturer based on a promotion and price computation model.

10. The processing device of claim 5, further comprising:

a display device configured to display information associated with a promotion and price computation model.

11. A non-transitory computer readable medium having recorded thereon program code for monitoring a contractual agreement over a network based on a model-based promotion and price computation model, wherein when the non-transitory computer readable medium is placed in communicable contact with a computing device the program code causes the computing device to execute a method comprising:

monitoring, in real-time, a plurality of sales parameters and promotion information received, in real-time, over the network;

receiving, upon occurrence of a triggering event, a key for decrypting a data segment among a plurality of data segments, wherein a plurality of encrypted sales promotions are stored as the plurality of data segments; and decrypting at least one of the plurality of encrypted sales promotions based on the triggering event and the key;

determining whether a current sales promotion should be implemented by comparing at least one of the plurality of sales parameters to a threshold, wherein the current sales promotion is included in the at least one of the plurality of encrypted sales promotions that are decrypted;

in response to determining that the current sales promotion is to be implemented evaluating retailer parameters for implementing the current sales promotion and calculating, in real-time, an adjusted retail price of goods for the current sales promotion to be implemented, transmitting the adjusted retail price of goods over the network for immediate display at a retailer, and auditing, in real-time, the plurality of sales parameters to determine whether the retailer has implemented the current sales promotion and whether the implementation is under manufacturer-specified criteria.

12. The computer readable medium of claim 11, wherein the method comprises:
    calculating an initial retail price of goods based on the promotion information and sales parameters among the plurality of sales parameters retailer received over the network.

13. The computer readable medium of claim 11, wherein the plurality of sales parameters includes at least one of velocity of sales by the retailer, total number of goods sold by the retailer, profitability to the retailer of items old, a value placed on goods by the retailer or a manufacturer, date, time, or inventory data.

14. The computer readable medium of claim 11, wherein transmitting the adjusted retail price of goods over the network comprises:
    transmitting the adjusted retail price of goods to a display controller of the retailer, the display controller configured to display the adjusted retail price of goods or information related to the adjusted retail price of goods on at least one remote display device.

15. The method according to claim 1, wherein the triggering event is based on whether the threshold is met.

16. The processing device of claim 5, wherein the triggering event is based on whether the threshold is met.

17. The computer readable medium of claim 11, wherein the triggering event is based on whether the threshold is met.

18. The computer readable medium of claim 11, wherein the method further comprises:
    determining whether the triggering event has occurred based on whether a current date is within a threshold proximity of a date of enforcement of the current sales promotion.

19. The method of claim 1, further comprising:
    determining whether the triggering event has occurred based on whether a current date is within a threshold proximity of a date of enforcement of the current sales promotion.

20. The processing device of claim 5, wherein the processor is configured to determine whether the triggering event has occurred based on whether a current date is within a threshold proximity of a date of enforcement of the current sales promotion.

21. The method of claim 1, wherein the promotion information associated with the manufacturer is promotion information received from the manufacturer.

* * * * *